(12) United States Patent
Korinchock

(10) Patent No.: US 6,425,388 B1
(45) Date of Patent: Jul. 30, 2002

(54) PIZZA OVEN DECK

(75) Inventor: Richard John Korinchock, Hazleton, PA (US)

(73) Assignee: The Garland Group, Freeland, PA (US)

( * ) Notice: Subject to any disclaimer, the term of this patent is extended or adjusted under 35 U.S.C. 154(b) by 0 days.

(21) Appl. No.: 09/576,143

(22) Filed: May 22, 2000

(51) Int. Cl.$^7$ .............................. F24C 15/32; A21B 1/00
(52) U.S. Cl. ................... 126/21 R; 126/41 R; 126/400; 99/447
(58) Field of Search ............................. 126/21 R, 21 A, 126/41 R, 273 R, 273.5, 375, 400, 8, 1 R, 1 D; 99/401, 447, 467

(56) References Cited

U.S. PATENT DOCUMENTS

| | | | | |
|---|---|---|---|---|
| 3,948,244 A | * | 4/1976 | Lazaridis et al. | 126/273.5 |
| 4,739,154 A | * | 4/1988 | Bhara et al. | 219/388 |
| 4,951,645 A | * | 8/1990 | Luebke et al. | 126/21 A |
| 5,413,033 A | * | 5/1995 | Riccio | 126/21 R |
| 5,605,092 A | * | 2/1997 | Riccio | 99/401 |
| 6,041,769 A | * | 3/2000 | Llodra, Jr. et al. | 126/273 R |
| 6,101,930 A | * | 8/2000 | Van Over | 126/273.5 |
| 6,125,837 A | * | 10/2000 | Mulberyy | 126/8 |

FOREIGN PATENT DOCUMENTS

DE    297 11 246 U1 * 11/1997

* cited by examiner

*Primary Examiner*—Henry Bennett
*Assistant Examiner*—Josiah C. Cocks
(74) *Attorney, Agent, or Firm*—Ohlandt, Greeley, Ruggiero & Perle, L.L.P.

(57) ABSTRACT

A pizza oven that has an air curtain or air wash along the bottom of the cooking stones that reduces heat transfer from the burners to the stones during idle modes to thereby prevent over heating and burning of pizza bottoms during an ensuing cooking mode. The heating stones are situated on a plurality of bosses that extend from a base plate disposed between the burner flame and the stones. The air curtain extends along a gap between the bottom surface of the stones and the upper surface of the base plate.

16 Claims, 3 Drawing Sheets

PIZZA OVEN DECK

BACKGROUND OF THE INVENTION

1. Field of the Invention

This invention relates to a pizza oven and, more particularly, to a pizza oven that has an improved performance and method of operation.

2. Description of the Prior Art

Many prior art pizza ovens employ one or more cooking stones disposed above a heater. The stones are typically mounted on a thin sheet of metal that faces the heater. The metal sheet prevents fragments of the stones from dropping downward toward the burner elements of the heater. When the pizza oven is used to cook pizza, the heater is operated at a high flame to heat the stones to a cook temperature.

After the pizza oven has been idle for awhile, it is typical to either turn down the flame of the burner elements or turn them off. In the case where the flame is turned down, a thermostat controls temperature in the region above the stones. However, the lower bypass flame continues to apply heat to the stones. The stones absorb the heat and tend to overheat. When a pizza is cooked after an idle or bypass mode, the burner is reset to the higher flame. This causes the stones to heat to even higher temperatures, with the result that the pizza bottom burns. Turning down the thermostat set point does not solve this problem for two reasons. First, the stones continue to absorb heat. Second, the oven air temperature will then be lower in the region above the stones. The result is burnt pizza bottoms and partially cooked tops.

For the case where the burner elements are turned off for an idle mode, the stones can lose so much heat that a pizza cooked after the idle mode has an undercooked bottom.

Thus, there is a need for a pizza oven that, after an idle mode, cooks a pizza without either undercooked or overcooked (burnt) bottoms.

SUMMARY OF THE INVENTION

According to the method of the present invention, a burner heats a cooking stone in a pizza oven with a high flame in a cooking mode and with a low flame in an idle mode. A heated airflow is directed to heat a region above the stone to a top cooking temperature during both the cooking mode and the idle mode. The burner is throttled during both the cooking and idle modes to regulate the top cooking temperature. A portion of the heated airflow is directed during the idle mode along a bottom surface of the stone to thereby reduce heat transfer from the low flame to the stone. This prevents overcooking or under cooking of a bottom of a pizza during an ensuing cook mode.

A pizza oven according to the invention includes an oven chamber with a cooking stone disposed therein for cooking pizza. A heater is disposed below the stone. A ductwork is disposed in the oven to supply a heated airflow to a region above the stone so as to provide heat for top cooking. A base structure includes a base plate located between the heater and the stone. The stone is supported above the base plate by a gap that communicates with the ductwork to direct a portion of the heated airflow through the gap along a bottom surface of the stone.

Preferably, a bottom surface of the stone is situated on a plurality of bosses that extend from an upper surface of the base plate. The gap is a space that is between the upper surface of the base plate and the bottom surface of the stone.

BRIEF DESCRIPTION OF THE DRAWING

Other and further objects, advantages and features of the present invention will be understood by reference to the following specification in conjunction with the accompanying drawings, in which like reference characters denote like elements of structure and.

DESCRIPTION OF THE INVENTION

Figure 1:
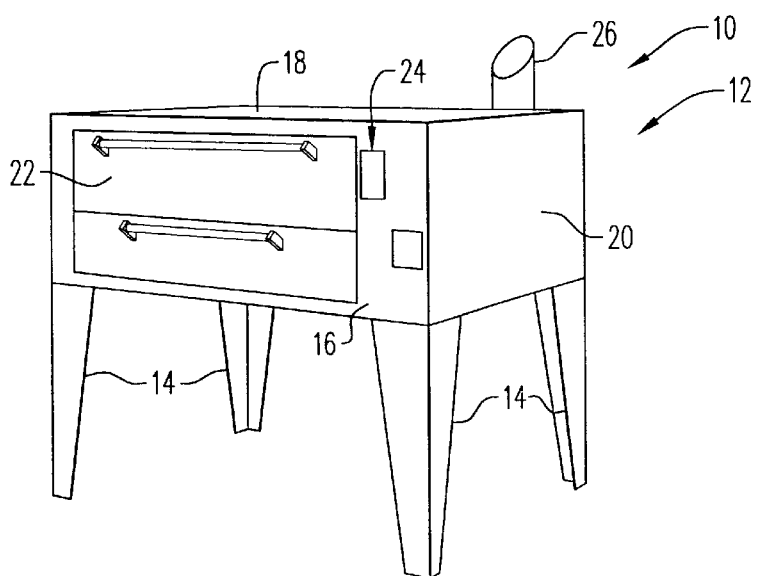
FIG. 1 is a perspective view of a pizza oven according to the present invention.

Referring to FIG. 1, a pizza oven 10 has a housing 12 that is supported on legs 14. Housing 12 has a front panel 16, a top panel 18 and a right side panel 20. It will be apparent to those skilled in the art that housing 12 has back panel, a bottom panel and a left side panel that are not visible in FIG. 1. Front panel 16 includes an oven door 22 and a control panel 24. Control panel 24 may include, for example, an on/off switch that controls electrical power and the application of gas to any gas burning heater used by pizza oven 10. Other controls may include a thermostat or temperature selector. A flue 26 extends vertically from, for example, the rear panel (not shown).

Figure 2:
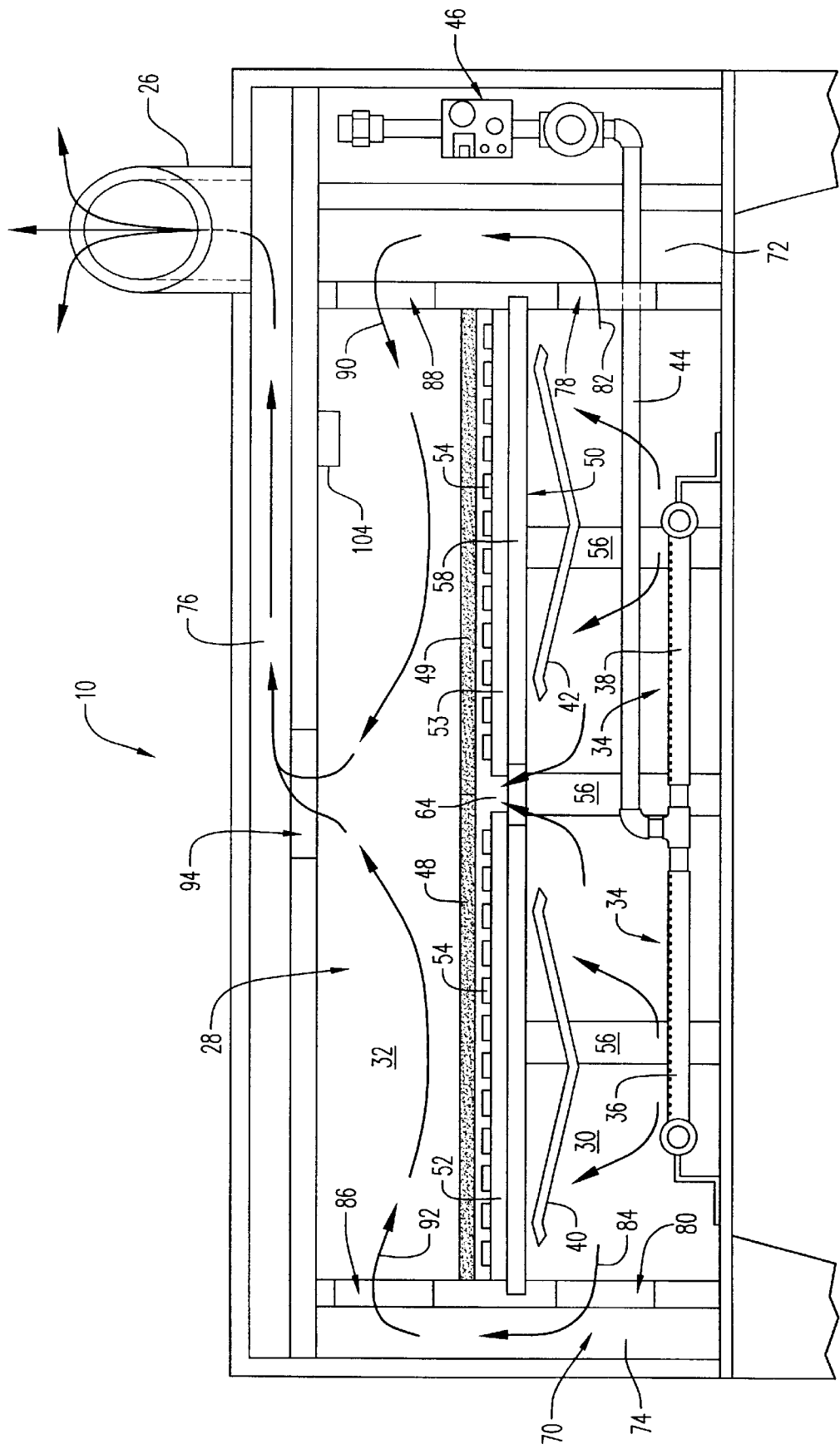
FIG. 2 is a front view of an oven portion of FIG. 1 with the front door and front panel removed.

Referring to FIG. 2, pizza oven 10 includes an oven chamber 28 that has a combustion chamber 30 and a cooking chamber 32. Combustion chamber 30 includes a heater 34 that has a pair of gas burners 36 and 38. Disposed above gas burners 36 and 38 are a pair of baffles 40 and 42, respectively. Baffles 40 and 42 distribute heat produced by burners 36 and 38 uniformly over a wide area. A gas conduit 44 supplies gas to burners 36 and 38 via a gas valve 46 that is connected to a gas service (not shown).

A pair of pizza stones 48 and 49 is supported above baffles 40 and 42 by a base structure 50. Base structure 50 includes a pair of metal plates 52 and 53 that each have an upper surface with a plurality of bosses 54 upon which pizza stone 48 is situated. Thus, pizza stone 48 is situated on bosses 54 that extend from metal plate 52 and pizza stone 49 is situated on bosses 54 that extend from metal plate 53. Base structure 50 includes one or more cross beams 58 and a plurality of posts 56 that support cross beams 58 and metal plate 52 above baffles 40 and 42. There is a gap 64 between metal plates 52 and 53 for air passage.

A ductwork 70 supplies airflow to cooking chamber 32 in the region above pizza stones 48 and 49 for top cooking. Ductwork 70 includes combustion chamber 30, a right side vertical duct 72, a left side vertical duct 74, a top horizontal duct 76, and flue 26. Air heated by burners 36 and 38 flows upwardly through openings 78 and 80 into right and left side ducts 72 and 74, as indicated by arrows 82 and 84. The airflow continues vertically in right and left side ducts 72 and 74 and exits via openings 86 and 88 cooking chamber 32, as shown by arrows 90 and 92. The heated airflow fills oven chamber 32 and exits via an opening 94 into top duct 76 as it travels toward flue 26 for exit to ambient. Air is admitted to pizza oven 10 through openings (not shown) provided by loose fitting of oven door 22.

Figure 3:
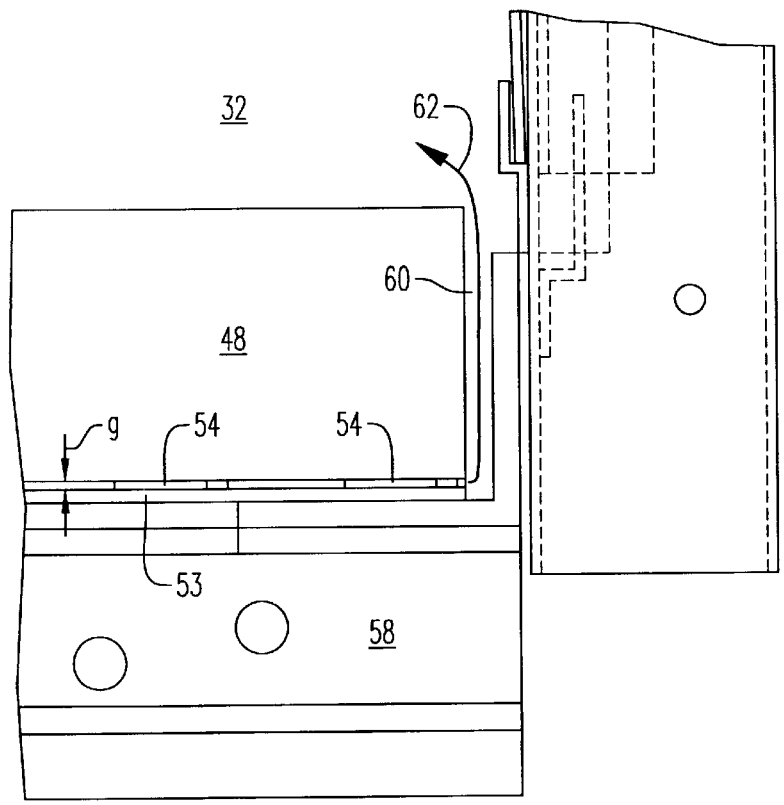
FIG. 3 is an enlarged view of a portion of FIG. 2.
Figure 4:
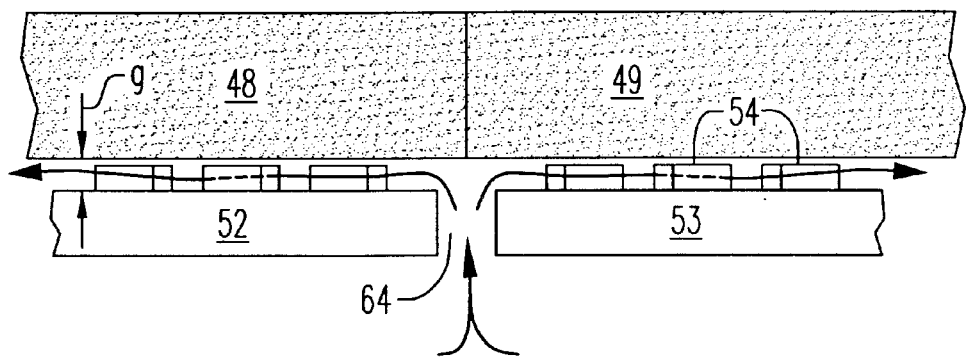
FIG. 4 is an enlarged view of another portion of FIG. 2.

Referring to FIGS. 2 through 4, bosses 54 elevate pizza stones 48 and 49 above metal plates 52 and 53 by a gap g (FIGS. 3 and 4). Heated airflow from combustion chamber 30 flows through gap 64 and continues in gap g toward the right and left as shown in FIG. 4. FIG. 3 shows the airflow exiting gap g to the right of metal plate 53 and pizza stone 49 via a draw space 60 into cooking chamber 32 as indicated by arrow 62. It will be appreciated that a similar draw space is provided at the left side of plate 52 and pizza stone 48.

Referring to FIG. 1, a pizza oven 10 has a housing 12 that is supported on legs 14. Housing 12 has a front panel 16, a top panel 18 and a right side panel 20. It will be apparent to those skilled in the art that housing 12 has back panel, a bottom panel and a left side panel that are not visible in FIG. 1. Front panel 16 includes an oven door 22 and a control panel 23. Control panel 23 may include, for example, an on/off switch that controls electrical power and the application of gas to any gas burning heater used by pizza oven 10. Other controls may include a thermostat or temperature selector. A flue 26 extends vertically from, for example, the rear panel (not shown).

The present invention avoids this problem of overcooked pizza bottoms by directing a portion of the airflow in gap g along the bottom surfaces of pizza stones 48 and 49 during idle modes. This airflow acts as an air wash or curtain to prevent heat generated from the lower flames of burners 34 and 36 from overheating pizza stones 48 and 49 during idle modes. That is, the air wash or air curtain acts to reduce heat transfer from the low flame of burners 34 and 36 to pizza stones 48 and 49. The heated airflow and thermostat throttling action tends to regulate the heat of pizza stones 48 and 49 in a range that prevents overcooking, as well as under cooking of pizza bottoms in an ensuing cook mode. The throttling action in an idle mode also serves to maintain the cook temperature of oven chamber 32 so that the pizza tops are not under cooked or overcooked during an ensuing cook mode.

Figure 5:
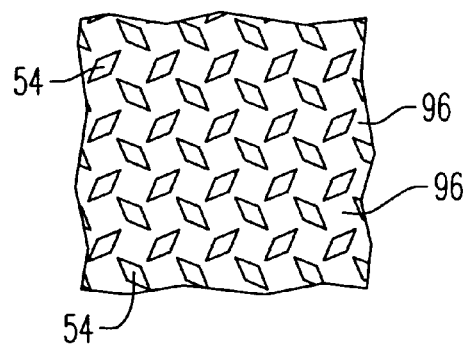
FIG. 5 is a top view of a portion of the metal plate shown in FIG. 2.
Figure 6:
FIG. 6 is a top view of a preferred boss for the metal plate of FIG. 5.

Referring to FIG. 5, bosses 54 are arranged in a plurality of rows 96 with alternate rows being offset and having opposite orientations. FIG. 6 shows an enlarged top view of a boss 54 as having a cross-section that is a parallelogram. Preferably, the parallelogram is diamond shaped. It will be appreciated that other cross-sectional shapes may be used to achieve similar heating effects of pizza stones 48 and 49.

It will be apparent that alternative structures can be used in pizza oven 10, while still obtaining the result of pizza stone heat regulation. For example, metal plates 52 and 53 can alternatively be a single metal plate with passages disposed to provide airflow in gap g. A plurality of oven chambers 28 can be vertically stacked.

The present invention having been thus described with particular reference to the preferred forms thereof, it will be obvious that various changes and modifications may be made therein without departing from the spirit and scope of the present invention as defined in the appended claims.

What is claimed is:

1. A pizza oven having an oven chamber with at least one cooking stone disposed therein for cooking pizza, said pizza oven comprising:
   a heater disposed below said stone to heat said stone for cooking pizza;
   a ductwork disposed in said oven to supply a heated airflow to a region above said stone so as to provide heat for top cooking; and
   a base structure that includes a base plate located between said heater and said stone, that supports said stone above said base plate by a gap, forming a continuous passageway and that communicates with said ductwork via said continuous passageway to direct some of said heated airflow through said gap along a bottom surface of said stone.

2. The pizza oven of claim 1, wherein said base plate has an upper surface with a plurality of bosses upon which said bottom surface of said stone is situated, said gap being a space that is between said upper and bottom surfaces.

3. The pizza oven of claim 2, wherein said plurality of bosses is arranged in an array of rows.

4. The pizza oven of claim 3, wherein each of said plurality of bosses has a cross-section that is a parallelogram.

5. The pizza oven of claim 1, further comprising a passageway that connects said gap with said ductwork.

6. The pizza oven of claim 5, wherein said base structure includes at least one edge that includes an edge opening that connects said gap with said ductwork.

7. The pizza oven of claim 6, wherein said stone is a first one of a plurality of stones, and wherein said plurality of stones are disposed in said base structure so as to define said passageway.

8. The pizza oven of claim 1, wherein said pizza oven is operable in a cook mode and in an idle mode, wherein the heater has a burner that operates with a high flame in the cook mode and with a low flame in the idle mode, and wherein the heated airflow acts as a curtain to reduce heat transfer from said low flame to said stone, thereby preventing said stone from overheating in the idle mode.

9. The pizza oven of claim 8, further comprising a thermostat control that operates to throttle the burner to regulate the temperature of said airflow and said region during both the cook mode and the idle mode.

10. The pizza oven of claim 1, further comprising at least one passageway that is connected to said gap and that is disposed along at least one peripheral edge of said stone, wherein said base plate includes an opening at a location remote from said passageway, and wherein a portion of said heated air passes through said opening, along said gap and through said passageway to said region above said stone.

11. A method of heating at least one cooking stone in a pizza oven, said method comprising:
   (a) operating a heating burner with a high flame during a cook mode to heat said cooking stone;
   (b) operating said heating burner with a low flame during an idle mode;
   (c) directing a heated airflow during step (a) to heat a region above said stone to a top cooking temperature;
   (d) throttling said heating burner during steps (a) and (b) to regulate said top cooking temperature; and
   (e) directing a portion of said heated airflow during step (b) via a continuous passageway formed between a bottom surface of said stone and a top surface of a base plate disposed between said stone and said heating burner, thereby reducing heat transfer from said low flame to said stone and preventing overcooking or under cooking of a bottom of a pizza during an ensuing cook mode.

12. A pizza oven that is operable in a cook mode and an idle mode comprising:
   an oven chamber and at least one cooking stone disposed therein;
   a heater disposed below said cooking stone that provides high heat during said cook mode and low heat during said idle mode;
   a ductwork disposed to provide heated air that flows to a region above said stone so as to provide heat for top cooking; and
   a base stricture that includes at least one base plate located between said cooking stone and said heater so as to define a continuous passageway between a bottom surface of said stone and said base plate, wherein said continuous passageway has a first opening adjacent an edge of said stone and a second opening remote from said first opening, and wherein a portion of said heated air flows through said second opening along said continuous passageway and out of said first opening so as to reduce heat transfer from said burner to said stone during said idle mode and prevent said stone from overheating during said idle mode.

13. The pizza oven of claim 12, wherein said ductwork is disposed to convey said heated air from below said base plate to said region and to said passageway via said second opening, and wherein said first opening is in fluid communication with said region.

14. The pizza oven of claim 12, wherein said base plate has a plurality of bosses that extend into said passageway to support said stone.

15. The pizza oven of claim 12, wherein said at least one stone is a first one of a plurality of stones arranged side by side, and wherein said passageway has a third opening adjacent another edge of said plurality of stones.

16. The pizza oven of claim 12, wherein said at least one base plate is a first one of a plurality of base plates disposed to form said passageway, and wherein said second opening is located between adjacent ones of said plurality of base plates.

* * * * *